Patented Dec. 24, 1929

1,740,819

UNITED STATES PATENT OFFICE

RICHARD KIRCHHOFF, OF BERLIN-LICHTERFELDE, AND MAX CANTOR, OF BERLIN-ZEHLENDORF, GERMANY, ASSIGNORS, BY MESNE ASSIGNMENTS, TO GENERAL ANILINE WORKS, INC., OF NEW YORK, N. Y., A CORPORATION OF DELAWARE

DISAZO DYES

No Drawing.  Application filed May 12, 1926, Serial No. 108,684, and in Germany May 15, 1925.

The invention relates to new disazo dyes suitable for dyeing animal fibers generally and particularly suitable for dyeing charged silk.

The new dyes are alkali metal salts of sulphonic acids corresponding to the general formula:

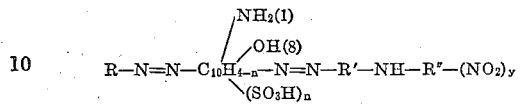

wherein R, R' and R'' represent aromatic radicals, y represents 1 or 2, and n is a whole number less than 3.

The dyes are, in the form of their sodium salts, dark powders soluble in water and dyeing wool, silk and charged silk generally speaking black tints. The dyes are destroyed by the action of strong reducing agents.

The new dyes may be manufactured by combining 1-amino-8-hydroxy-naphthalene sulphonic acid, such as 4-sulphonic acid, 3.6-disulphonic acid, 4.6-disulphonic acid, in an acid medium with a diazotized compound of the general formula:

wherein R' and R'' represent aromatic radicals, y represents 1 or 2, and in an alkaline medium with any diazo compound.

Another process consists in introducing a nitrated aromatic radical into the known disazo dyes of the constitution:

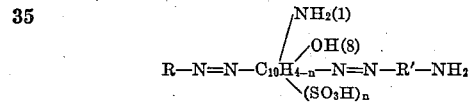

wherein n is a whole number less than 3 and R and R' represent aromatic radicals, thus substituting the free amino group connected with R'. This substitution may be carried out by reacting on the said aminodisazo dyes with a nitrated halogenaryl compound, such as 2.4-dinitro-1-chlorobenzene, 2.6-dinitro-1-chlorobenzene, 4-nitro-1-chlorobenzene-2-sulphonic acid, 2.4-dinitro-1-chlorobenzene-6-sulphonic acid, 2.6-dinitro-1-chlorobenzene-4-sulphonic acid.

The following example, without limiting the invention, illustrates one manner in which the dyes may be produced, the parts being by weight.

58.6 parts of the known disazo dye, prepared by combining 1 molecule of 1-amino-8-hydroxynaphthalene-3.6-disulphonic acid with 1 molecule of 4-nitrodiazo-benzene in the presence of hydrochloric acid and with 1 molecule of diazobenzene in the presence of sodium carbonate and then reducing the nitro group, are dissolved in 1000 parts of water. This solution is boiled during 10 hours in a reflux apparatus with 20 parts of 2.4-dinitro-1-chlorobenzene and 20 parts of crystallized sodium acetate. The reaction product settles out during the boiling operation. After cooling the reaction product is isolated by filtration, washed with a very diluted solution of sodium chloride and dried. It forms a dark powder soluble in hot water, but much more difficultly soluble than the disazo dye used as starting material, and is in contradistinction to the said starting material, fast to acids. It dyes wool and uncharged silk greenish black tints and yields full deep dyeings on charged silk. The dye is the sodium salt of the disulphonic acid corresponding to the formula:

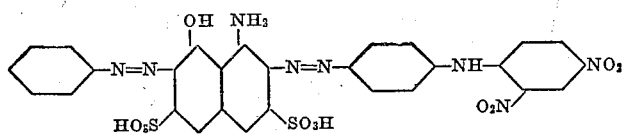

By substituting, in the example, 5-nitro-2-diazo-1-methoxybenzene for 4-nitrodiazobenzene a similar dye is obtained. Also 4-nitrodiazobenzene-2-sulphonic acid may be used. Instead of diazobenzene another diazo compound may be used such as diazotoluene, a diazobenzene sulphonic acid, diazochlorobenzene, diazonaphthalene. As other aminohydroxynaphthalene sulphonic acids suitable for manufacturing the dyes of the present invention, 1-amino-8-hydroxynaphthalene-4-sulphonic acid, 1-amino-8-hydroxynaphthalene-5-sulphonic acid, 1-amino-8-hydroxynaphthalene-4.6-disulphonic acid may be mentioned.

We claim:

1. The disazo dyes being dark powders soluble in water and being destroyed by strong reducing agents, dyeing wool, silk and charged silk black, these dyes being alkali metal salts of sulphonic acids of the general formula:

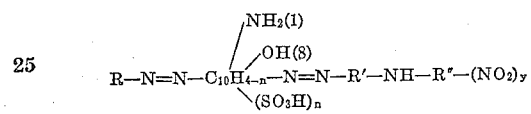

wherein R, R' and R'' represent aromatic radicals, $y$ represents 1 or 2, and $n$ is a whole number less than 3.

2. The disazo dyes of the properties and the general formula mentioned in claim 1, in this formula R being a radical of the benzene series.

3. The disazo dyes of the properties and the general formula mentioned in claim 1, in this formula R' being a radical of the benzene series.

4. The disazo dyes of the properties and the general formula mentioned in claim 1, in this formula R'' being a radical of the benzene series.

5. The disazo dyes of the properties and the general formula mentioned in claim 1, in this formula R and R' being radicals of the benzene series.

6. The disazo dyes of the properties and the general formula mentioned in claim 1, in this formula R, R' and R'' being radicals of the benzene series.

7. The disazo dyes of the properties mentioned in claim 1 and being alkali metal salts of an acid of the general formula:

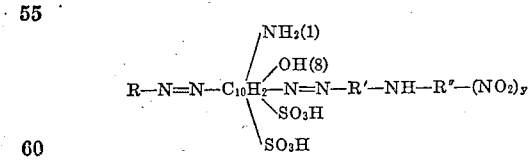

wherein R and R' represent aromatic radicals, R'' represents an aromatic radical of the benzene series, and $y$ represents 1 or 2.

8. The disazo dyes of the properties mentioned in claim 1, being alkali metal salts of an acid of the general formula:

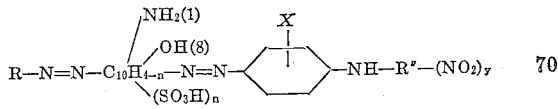

wherein R represents an aromatic radical, R'' represents an aromatic radical of the benzene series, $x$ represents an univalent substituent of the group including hydrogen, methoxy and sulfo, $y$ represents 1 or 2, and $n$ is a whole number less than 3.

9. The disazo dyes of the properties mentioned in claim 1 and of the general formula:

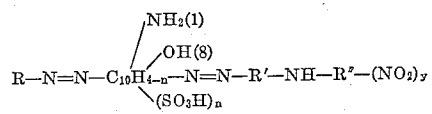

wherein R and R' represent aromatic radicals, R'' represents a radical of the benzene series which may be further substituted by a sulfonic acid group, $y$ represents 1 or 2, and $n$ is a whole number less than 3.

10. The disazo dyes of the properties mentioned in claim 1 and of the general formula:

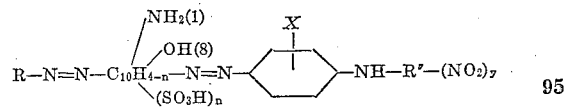

wherein R represents an aromatic radical and R'' represents a radical of the benzene series which may be further substituted by a sulfonic acid group, $x$ represents an univalent substituent of the group including hydrogen, methoxy and sulfo, $y$ represents 1 or 2 and $n$ is a whole number less than 3.

11. The disazo dyes of the properties mentioned in claim 1, being alkali metal salts of sulphonic acids of the general formula:

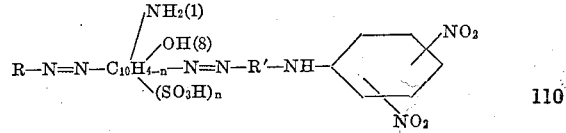

wherein R and R' represent aromatic radicals and $n$ is a whole number less than 3.

12. The disazo dyes of the properties mentioned in claim 1, being alkali metal salts of sulphonic acids of the general formula:

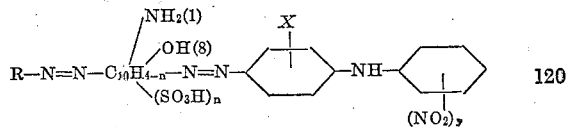

wherein R represents an aromatic radical, $x$ represents an univalent substituent of the group including hydrogen, methoxy and sulfo, $y$ represents 1 or 2 and $n$ is a whole number less than 3.

13. The disazo dye being a dark powder soluble in water and being destroyed by strong reducing agents, dyeing wool, silk and charged silk greenish black, this dye being an alkali metal salt of the acid corresponding to the formula:
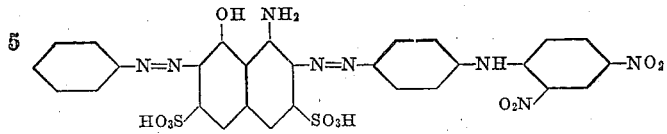
In testimony whereof we affix our signatures.
RICHARD KIRCHHOFF.
MAX CANTOR.